US012042457B2

(12) United States Patent
Howe

(10) Patent No.: US 12,042,457 B2
(45) Date of Patent: *Jul. 23, 2024

(54) WATER ENCAPSULATED AND MECHANICAL HYBRID BODY MASSAGE CHAIR WITH RAPID HEATING AND COOLING CONTROL

(71) Applicant: Diferynt Innovation LLC, Boulder, CO (US)

(72) Inventor: Todd Howe, Fort Collins, CO (US)

(73) Assignee: Diferynt Innovation LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,942

(22) Filed: Mar. 9, 2023

(65) Prior Publication Data

US 2023/0218474 A1 Jul. 13, 2023

Related U.S. Application Data

(63) Continuation of application No. 16/905,564, filed on Aug. 25, 2020, now Pat. No. 11,602,482.

(Continued)

(51) Int. Cl.

*A61H 15/00* (2006.01)
*A61H 9/00* (2006.01)
*A61H 23/00* (2006.01)

(52) U.S. Cl.

CPC ....... *A61H 15/0078* (2013.01); *A61H 9/0021* (2013.01); *A61H 23/006* (2013.01); *A61H 2009/0042* (2013.01); *A61H 2015/0014* (2013.01); *A61H 2201/0149* (2013.01); *A61H 2201/0207* (2013.01); *A61H 2201/0214* (2013.01); *A61H 2201/0242* (2013.01);

(Continued)

(58) Field of Classification Search

CPC .............. A61H 15/0078; A61H 9/0021; A61H 23/006; A61H 2009/0042; A61H 2201/164; A61H 2201/0242; A61H 2201/165; A61H 15/00; A61H 2015/0078; A61H 2015/0071; A61H 2015/0064; A61H 2015/005; A61H 2015/0035; A61H 2015/0021; A61H 2015/0007; A61H 2015/0014

See application file for complete search history.

(56) References Cited

U.S. PATENT DOCUMENTS 6,793,636 B1 * 9/2004 Pepera .................. A61H 15/02
D24/207

* cited by examiner

*Primary Examiner* — Michael R Reid
*Assistant Examiner* — Nathan M Le
(74) *Attorney, Agent, or Firm* — William H. Quirk; Rosenthal Pauerstein Sandoloski Agather, LLP

(57) ABSTRACT

A chair is disclosed for providing water and air adjustable massage. The massage chair includes a surface that is easy to clean, and water-filled rollers within the chair to apply a massaging effect to the body of the user thereon. Each water-filled roller incorporates a foam inner roller that is surrounded by either a cylindrical water-filled wrap or water-filled inserts. The massage chair incorporates a leg section to perform a percussive and vibrating massage on the legs of the user thereon. The massage chair has the ability to recline and to apply heat and/or cooling to the user thereon. The massage chair incorporates auto-sensing controls, massage pattern software, and Cloud Control Software that enables the owner in a commercial environment to establish the time for use, frequency, and price for the massage session.

1 Claim, 7 Drawing Sheets

Related U.S. Application Data

(60) Provisional application No. 62/862,777, filed on Jun. 18, 2019.

(52) U.S. Cl.
CPC .................. *A61H 2201/164* (2013.01); *A61H 2201/5007* (2013.01); *A61H 2201/5046* (2013.01); *A61H 2203/0431* (2013.01)

| | Premium Membership | Express Membership | Massage Membership |
|---|---|---|---|
| Massage Sessions | Unlimited | 10 Sessions | 5 Sessions |
| Monthly Pricing | $149 | $89 | $49 |

WATER ENCAPSULATED AND MECHANICAL HYBRID BODY MASSAGE CHAIR WITH RAPID HEATING AND COOLING CONTROL

CLAIM OF PRIORITY TO PRIOR APPLICATION

This application is a continuation of U.S. patent application Ser. No. 16/905,564, filed on Aug. 25, 2020, entitled "Water Encapsulated and Mechanical Hybrid Body Massage Chair with Rapid Heating and Cooling Control," which claims the benefit of the filing date of U.S. Provisional Application, Ser. No. 62/862,777, filed on Jun. 18, 2019, entitled "Dry-Hydrotherapy Body Massage Chair with Water Filled-Rollers." By this reference, the entire disclosures, including the claims and drawings, of the above-identified applications are hereby incorporated by reference into the present disclosure as though set forth in their entirety.

NONPUBLICATION REQUESTED—NON-PROVISIONAL APPLICATION

This application is a Non-Provisional Application under 37 CFR 1.53(b) and submitted with an accompanying non-publication request in accordance with 35 U.S.C § 122(b)(2)(B). Accordingly, the subject matter of this application is to be maintained in secrecy until and unless Applicant allows a patent to issue based on this application.

BACKGROUND OF THE INVENTION

1. Field of the Invention

The present invention relates generally to apparatus for applying a massage to the body of a user, and, specifically to a dry hydrotherapy massage chair utilizing water-filled spheres to apply a massage effect.

2. Description of Related Art

The global health and wellness industry is growing rapidly with revenues, according to some estimates, exceeding $2-3 trillion per year. According to surveys conducted by the Centers for Disease Control and Prevention, more than two-thirds of adults in the United States are considered overweight or obese, with more than one-third of adults being considered obese. Yet, despite these market forces, some estimates indicate that less than 20% of the population of the United States is a member of a health club or fitness center. These two overwhelming national statistics, the growth of wellness dollars spent and the continuing growth rate of the overweight/obese populations, underscore the interest and need of people to look and feel better. Unfortunately, convenient and regular access to massage is simply unaffordable to the majority of the population. Additionally, now more than ever, people suffer tension and stress, chronic pain, lack of exercise, and a broad range of conditions which are often best treated with massage.

Segments of the population which either need or often seek information and opportunity for improving personal health and wellness include those people who are overweight or obese, senior citizens, people who are already active and fit, and those people who suffer with chronic pain. Most people fall into one or more of these categories. These key demographics include: an overweight population exceeding 130 million; those purchasing hands-on massage numbering 40 million; active fitness individuals exceeding 35 million in number; chronic pain sufferers being approximately 95 million people; and a senior citizen population of over 40 million, which is the fastest growing population segment.

Often, those who are overweight or obese may feel out of place in a health club and may be too embarrassed or uncomfortable receiving a hands-on massage. Yet, these same people want and need the benefit and results that exercise and massage can deliver. The overweight population is thought to be highly interested in receiving touchless massage due to the discreet nature of privacy as compared to traditional hands-on massage. Interest is also thought to be due to their bodies' response to massage, which is often greater than people who are considered in the normal range of body weight. More tissue and body mass requires additional stimulation during massage to offset some of the complications that accompanies extra weight.

Senior citizens represent a large and growing segment of the population. More and more seniors are actively seeking information about how to improve mobility and achieve better health. Delivery of concise and accurate information, as well as the provision of helpful and needed services, can help seniors better understand how their health and bodies change over time.

Active people are more likely to know and understand the benefit of massage, exercise and nutrition and the role that each plays in maintaining a healthful and more enjoyable lifestyle. Such people who already care enough to exercise are more likely to be inclined to want to enhance their fitness quest with the systems and methods disclosed herein.

Health and wellness services, most particularly the type of dry hydrotherapy massage which is a substantial component of the system and methods herein described, is especially meaningful with respect to a number of chronic pain conditions due to the analgesic benefits of penetrating heat and deep tissue massage. In many instances, people who suffer from chronic pain are prescribed massage as a therapy or treatment as a method for relieving the pain. Leading healthcare professionals generally agree that massage not only feels good but is very beneficial to a person's overall health.

Traditional massage chairs, offer all of the above benefits, but, they can be problematic for some users. Often, the hard or softer foam rollers used in traditional massage chairs can be too painful for some. Additionally, over 90% of the massage chairs on the market contain bacteria collecting folds and cavities on the surface on which the user sits. These folds and cavities can be virtually impossible to properly clean and unsanitary in a commercial environment.

Dry hydrotherapy massage, is a critical factor for the majority of people for achieving and maintaining better health. Moreover, the effects of a one-hour hands-on massage can be felt in as little as a 15-minute dry hydrotherapy massage session. There is a need for having access to such therapies in a sanitary and less painful manner to all users.

BRIEF SUMMARY OF THE INVENTION

Disclosed embodiments are enabled to provide an encapsulated water and mechanical hybrid massage in a manner which is less painful and more comfortable than existing devices. Furthermore, disclosed embodiments offer a device that is sanitary and easy to clean after each use.

To those ends, among others, the disclosed embodiments include water pads within the chair that can be either rapidly heated or cooled to aid in recovery after an injury or physical activity. In some embodiments, temperature is capable of water temperature changes from 55 to 95 degrees Fahrenheit in approximately 60 seconds. Disclosed embodiments can include additional pads that are easily attached to the main water line to provide heat or cooling anywhere on the body of the user of the chair system.

Disclosed embodiments include a means for providing a less painful massaging experience to the user with the use of air or water-filled rollers within a dry hydrotherapy massage chair. Embodiments of the dry hydrotherapy massage chair provide tolerable, comfortable, and optimal therapy to the body of the user.

Disclosed embodiments further include a surface that is sanitary and easily cleaned. To achieve this, disclosed embodiments only have stitching on areas of the chair system that do not contact the user's body. Accordingly, areas of the chair that users contact include a smooth bacteria-resistant surface that is easily cleaned and sanitized by wiping down.

In addition to those features mentioned above, disclosed embodiments may include components that provide the ability to simultaneously massage the legs of the user of the massage chair. Some preferred embodiments incorporate a leg section as part of the disclosed dry hydrotherapy massage chair to perform either percussion or vibration massage to the user's legs based on the user's preference or need.

Disclosed embodiments of the dry hydrotherapy massage chair include proprietary software programs that enable manipulation of the roller system such that the roller system provides a unique wave pattern. More particularly, disclosed embodiments of the dry hydrotherapy massage chair deviate from the traditional wide back and forth sweeping motion that cross over many muscle fibers causing irritation, that is used in many existing massage chairs. Instead, the disclosed embodiments use a much narrower pass that mimics more of a human hand providing the massage, providing a less painful and more enjoyable massage for the user.

Another object of the present invention is to offer a massage chair that is both convenient and cost effective for business owners to charge clients to use. In some preferred embodiments, software is implemented into the massage chair to allow the owner to establish the time for use, price of the session, and frequency of massage.

It is also contemplated the massage chair will be full-featured and include features such as zero gravity, full recline, heat, auto-sensing controls, and multiple massage programs.

The disclosure, including descriptions, drawings, and claims, describes one or more embodiments of the invention. Many other features, objects, and advantages of the invention will be apparent to one of ordinary skill in the art from the disclosure. Given the disclosure, especially in light of the prior art, it is another object of the invention to improve upon, and overcome the inefficiencies, limitations, and constraints of, the prior art.

DETAILED DESCRIPTION OF PREFERRED EMBODIMENTS

The disclosures of this patent application, including the descriptions, drawings, and claims, describe one or more embodiments of the invention in more detail. Many other features, objects, and advantages of the invention will be apparent from these disclosures to one of ordinary skill in the art, especially when considered in light of a more exhaustive understanding of the numerous difficulties and challenges faced by the art. While there are many alternative variations, modifications and substitutions within the scope of the invention, one of ordinary skill in the art should consider the scope of the invention from a review of any claims that may be appended to applications and patents based hereon, including any amendments made to those claims in the course of prosecuting this and related applications.

Preferred embodiments of the present invention involve a water and air adjustable massage chair 10 implementing the provision of water and air adjustable massage to the body of the user using water-filled rollers 20.

It is contemplated that water and air adjustable massage chair 10 will provide a more comfortable form of massage that is accessible to more users. The benefits of hydrotherapy massage include, but are not limited to, pain reduction, lymphatic stimulation, improved circulation, relaxation, and reduced stress. Despite the numerous benefits associated with traditional massage chairs, they are often not used due to pain or discomfort experienced by some users. The water and air adjustable massage chair 10 alleviates these issues by utilizing water in its roller system to apply a more comfortable massage to the user in addition to the air adjustable bladder that allow more separation between the body and the rollers.

In contrast to the hard or soft foam rollers used in traditional massage chairs, water filled rollers 20 are used in the water and air adjustable massage chair 10 to allow greater surface contact between the roller and the user. The water in the rollers 20 disperses pressure as it makes contact with the user's body. The rollers 20 will mimic more of the feel of a human hand, and varying the water pressure will allow differing levels of softness and feel. As a result, the user of massage chair 10 experiences a less painful and more customizable massage in contrast to previous massage chair designs. The present invention 10 appeals to those segments of the population who experience pain from use of traditional massage chairs, and who therefore would likely avoid use otherwise.

Figure 1:
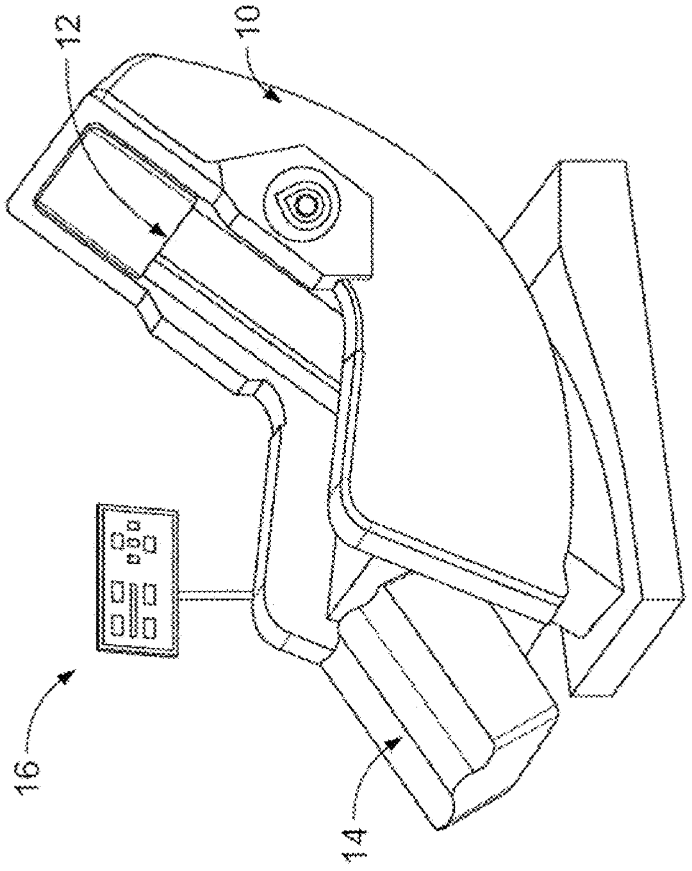
FIG. 1 is a photograph of an embodiment showing the water and air adjustable massage chair 10.

As shown in FIG. 1 preferred embodiments of the water and air adjustable massage chair 10 incorporate a flat surface 12 that has no exposed seams, is moisture proof, and is preferably treated with an anti-bacterial additive. The flat surface 12 allows a user or operator to quickly and effectively clean the part of the massage chair 10 that directly touches the body of users in a commercial environment. As those persons skilled in the art will readily recognize, the combination of an anti-bacterial inhibitor and the elimination of folds and cavities on the massage chair surface 12 discourages harmful germ growth on massage chair 10. As a result, the massage chair 10 is more sanitary and easier to clean for owners than massage chair designs that do contain exposed seams or bacteria trapping folds and cavities.

Preferred embodiments of the water and air adjustable massage chair 10 incorporate a leg section 14 that is capable of applying massage to the legs of the user, as shown in FIG. 1. The leg section 14 of the massage chair 10 will incorporate a mechanism that can either perform a vibration or a powerful tapping-like massage to the user's legs. As shown in FIG. 1, the leg section 14 will have a flat surface 12, providing the benefits previously described above.

As shown in FIG. 1, preferred embodiments of the water and air adjustable chair 10 may incorporate an input device, such as touchscreen 16, connected or in proximity to massage chair 10 for interacting with and operating the system for controlling functional aspects of massage chair 10. Touchscreen 16 may be connected to massage chair 10 in a wired or wireless configuration. In some embodiments of massage chair 10, the touchscreen 14 is mounted so as to allow a user of massage chair 10 to interact with touchscreen 16 while seated in massage chair 10 and receiving water and air adjustable massage.

Figure 2:
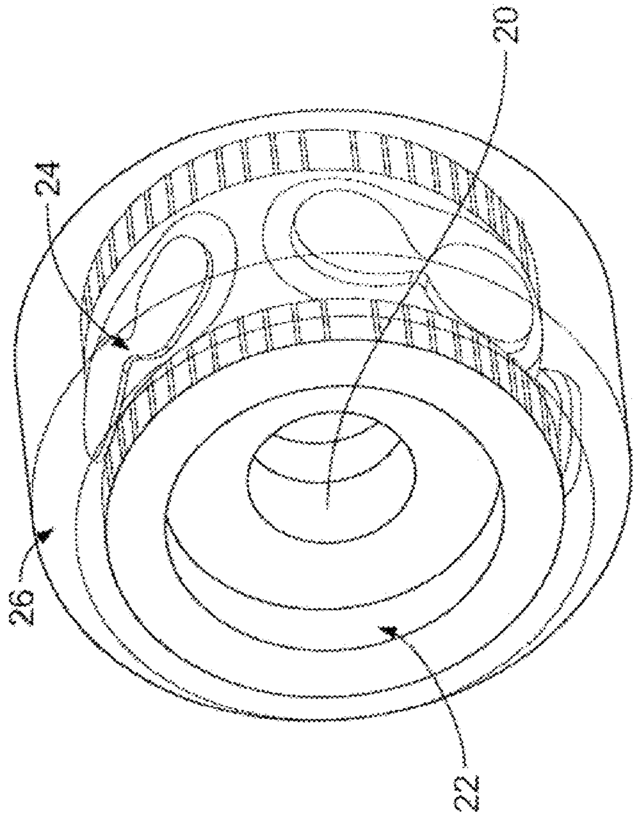
FIG. 2 is a photograph of one embodiment of the massage rollers 20 including an inner roller 22, inner water packs 24, and outer protective ring 26.

As seen in FIG. 2, preferred embodiments of the water and air adjustable massage chair 10 incorporate the use of massaging rollers 20. Rollers 20 preferably include a thermoplastic elastomer ("TPE") or silicone inner roller 22, inner water packs 24 constructed of a thermoplastic polyurethane ("TPU") material, and a TPE or silicone outer protective ring 26.

Figure 4A:
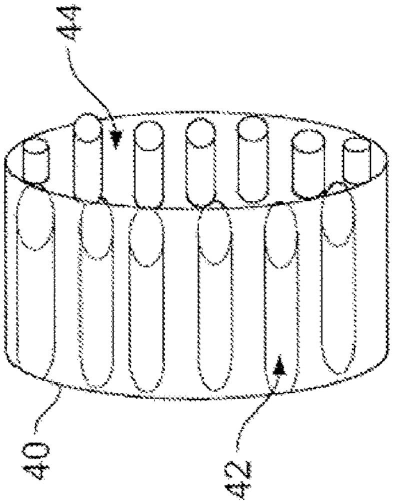
FIGS. 4A & 4B illustrate another embodiment of the massaging rollers 40 with water filled inserts 42 placed around the exterior perimeter of a foam inner roller 44.
Figure 4B:
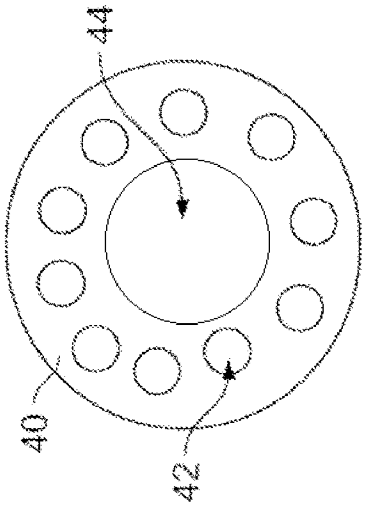
Figure 3A:
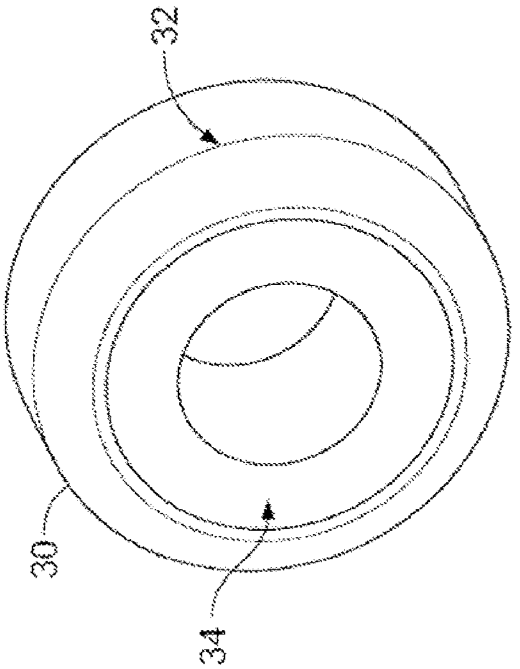
FIGS. 3A & 3B depict one embodiment of the massaging rollers 30 including a cylindrical water-filled wrap 32 over a foam inner roller 34.
Figure 3B:
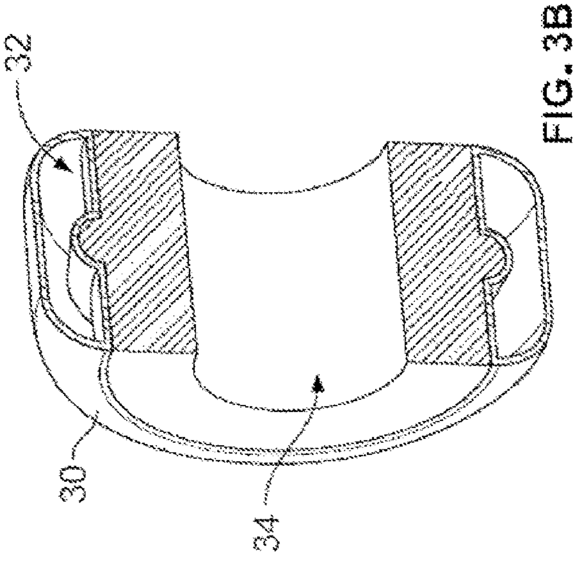

As seen in FIGS. 3A-3B, some preferred embodiments of water and air adjustable massage chair 10 incorporate the use of massaging rollers 30 with water filled inserts 32 placed around the exterior perimeter of a foam inner roller 34. Some preferred embodiments of the water and air adjustable massage chair 10 incorporate the use of massaging rollers 40 with water filled inserts 42 placed around the exterior perimeter of a foam inner roller 44, as seen in FIGS. 4A-4B.

Figure 5:
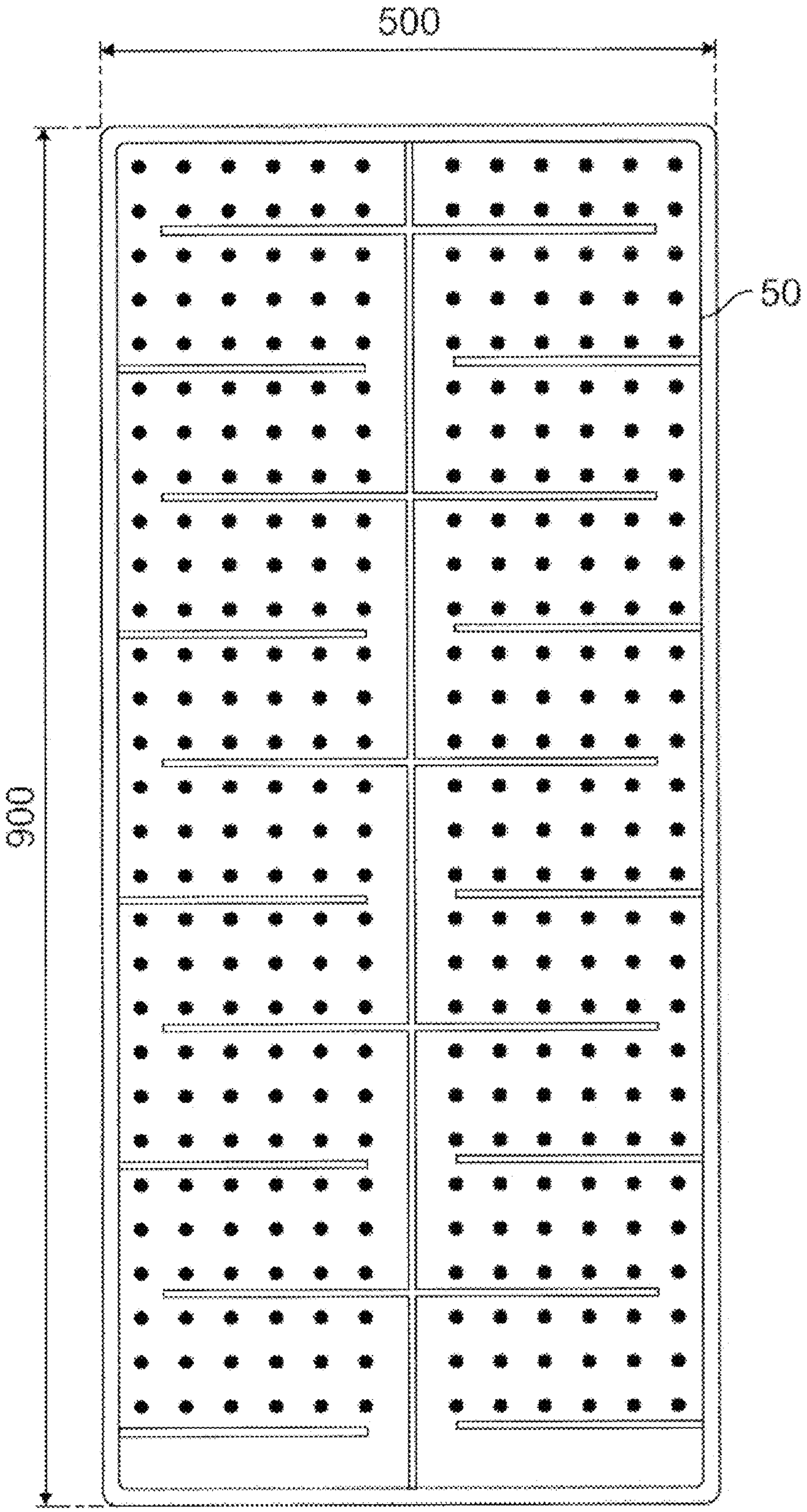
FIG. 5 illustrates an embodiment of a water-filled heating and cooling pad 50 that may be incorporated into any of the disclosed embodiments of the water and air adjustable massage chair 10.

As seen in FIG. 5, preferred embodiments of the water and air adjustable massage chair 10 incorporate water-filled a water-filled pad 50 that can rapidly heat or cool the user. Water is circulated and regulated by a small pump and is circulated through a heating and cooling unit. The pads 50 are rapidly cooled or heated through a series of water ducts incorporated within. Embodiments of the water-filled pad 50 can change temperature rapidly, they can increase in temperature from 55 degrees to 95 degrees Fahrenheit in approximately 60 seconds. Inversely, water-filled pad 50 can cool to 55 degrees from 95 degrees in the same amount of time. The water temperature in the water-filed pads 50 incorporated in the massage chair 10 has a therapeutic effect for the user, and cooling aids in recovery after an injury or physical activity. It should be noted that the exact temperatures provided are merely for example to illustrate the rapid temperature changing technology incorporated in the water-filled pads, and various temperatures can be achieved in relatively the same amount of time.

Figure 6:
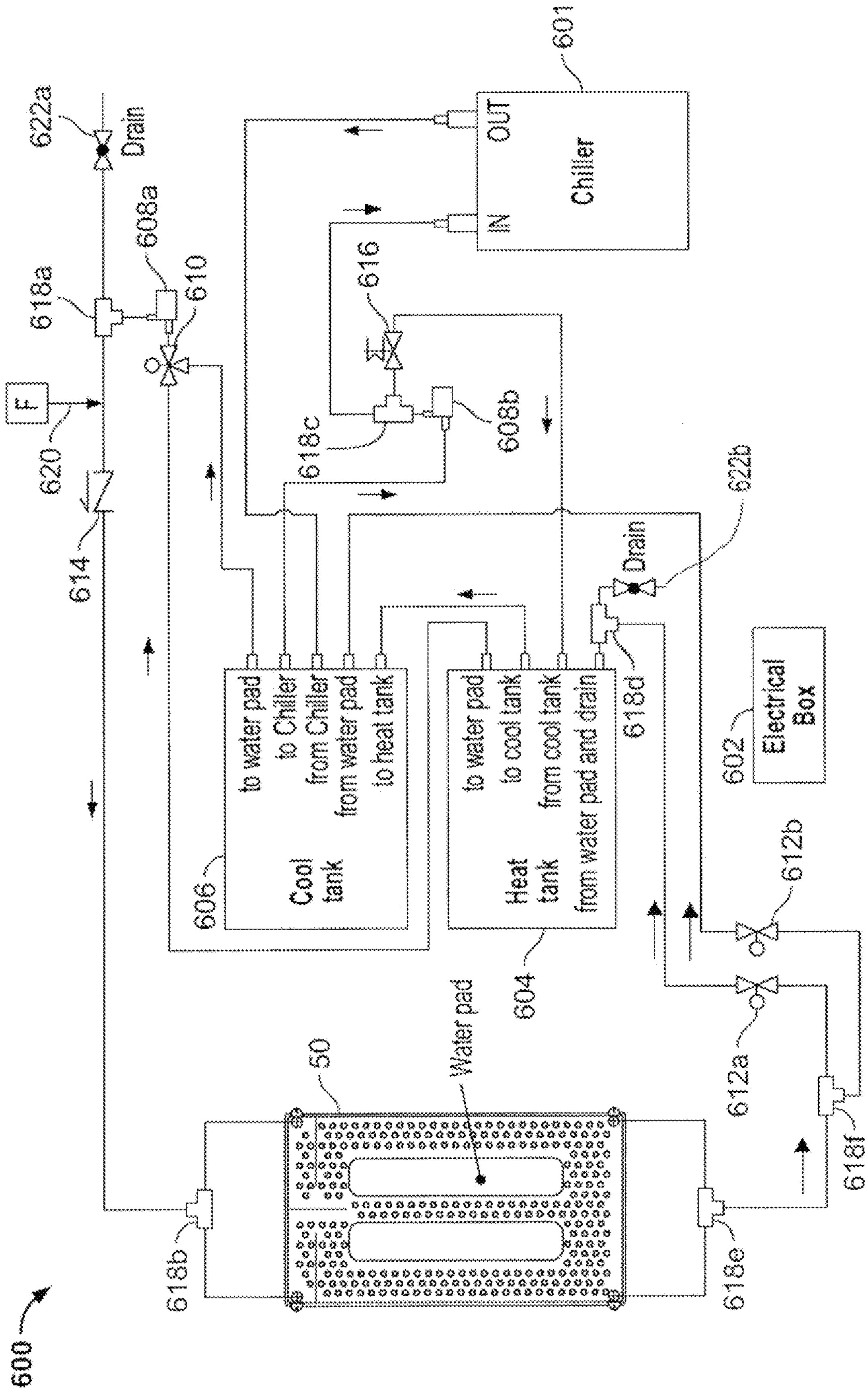
FIG. 6 is a schematic view of the water heating and cooling system incorporated in the massage chair 10.

In FIG. 6 the schematic for an embodiment of the water temperature control system 600 is shown. Components include the water-filled pad 50, a chiller 600, electrical box 602 to power the system, heat tank 604, and cool tank 606. Water is circulated and regulated by a small pumps **608*a* & 608*b* and is circulated through a heating tank 604 and a cooling tank 606. Electric three-way valve, 610 electric two-way valves 612*a* & 612*b*, check valve 614, solenoid valve 616, T-joints 618*a*-618*f*, and row switch 620 connect the hoses and direct water to the appropriate areas. Water from the system is released through drains with ball valves 622*a* & 622*b*. The flow of water through the temperature control system 600 is indicated by the various flow arrows illustrated in FIG. 6. Those skilled in the art will recognize that the schematic in FIG. 6** represents one embodiment, and other components or combination of components can be assembled in alternative methods to achieve the same effect.

Additional components may be attached directly to the water system in FIG. 6 such as an additional heating or cooling pad that can be placed on different areas of the user's body during use of the massage chair 10.

Figure 7A:
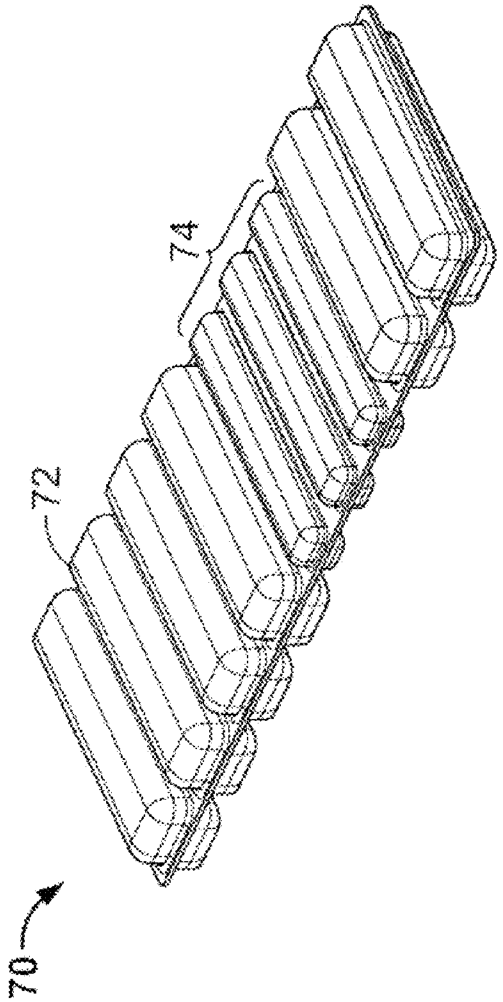
FIGS. 7A & 7B show drawings of one embodiment of the air-filled massage intensity regulation chambers 70 having individual adjustable air bladders 72.
Figure 7B:
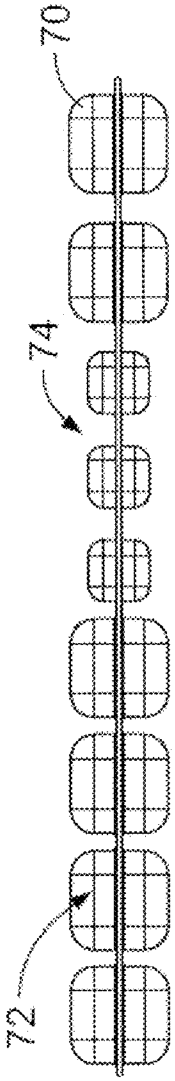

Turning now to FIGS. 7A-7B, regulation chambers 70 allow the massage chair 10 to accommodate a variety of body builds or types in a single chair system. Regulation chambers 70 are positioned in the back portion of massage chair 10. Users can inflate or deflate three sections of air bladders 72 to enable the air bladders 72 to conform to their body, providing a more comfortable and less painful massage. The center portion 74 of the air-filled regulation chambers 70 is thinner to provide a more consistent massage. The center portion 74 of the air-filled regulation chambers 70 accommodates the curvature of the spine and gives the needed support to the lower back of the user.

Preferred embodiments of the water and air adjustable massage chair 10 incorporate Air-filled massage intensity regulation chambers 70, as seen in FIGS. 7A-7B. Incorporating the Air-filled massage intensity regulation chambers 70 furthers the objective of providing a less intense massage experience to the user by offsetting pressure caused by the body weight of the user.

It is also contemplated that the massage chair 10 will be full-featured and incorporate desirable features such as zero gravity, full recline, auto-sensing controls, and multiple massage programs.

Figure 8A:
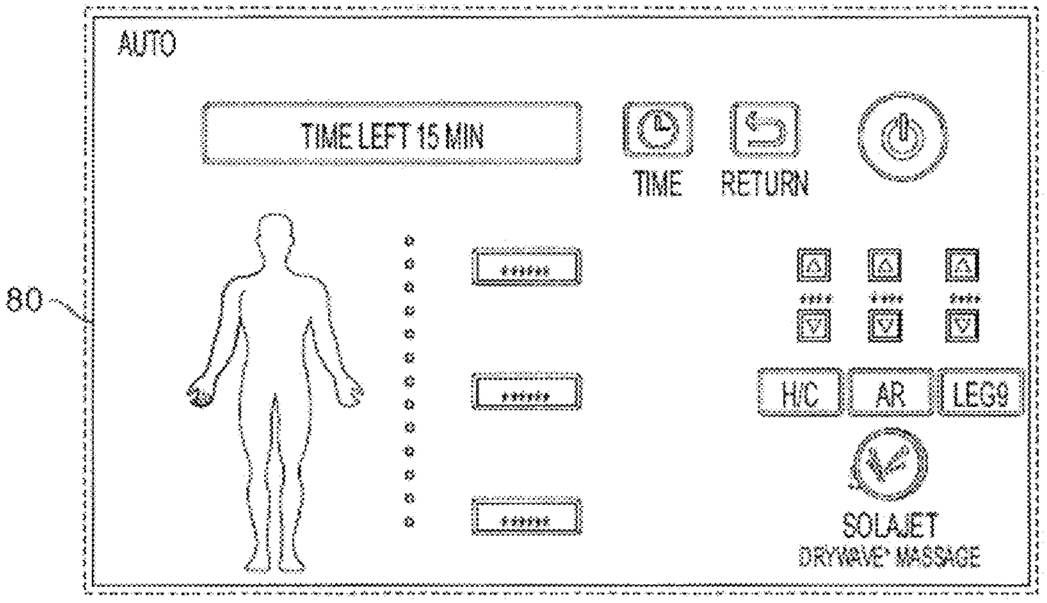
FIGS. 8A & 8B show screenshots of an example chair control menu 80 as it would appear on an attached touch-screen 16 or mobile device.

Referring now to FIG. 8A, there is shown a screenshot of a control menu screen 80 exhibiting various options for a user wherein the user is able to customize the water and air adjustable massage experience and to interact with and operate the massage chair 10. The user has the ability to select various options for a water and air adjustable massage through the course of accessible menus presented on touchscreen 16. At the outset, as will be understood by those of ordinary skill in the relevant art, the menu displays as shown on touchscreen 16 are merely for illustrative purposes only and are only examples of a preferred embodiment of the system 10.

Figure 8B:
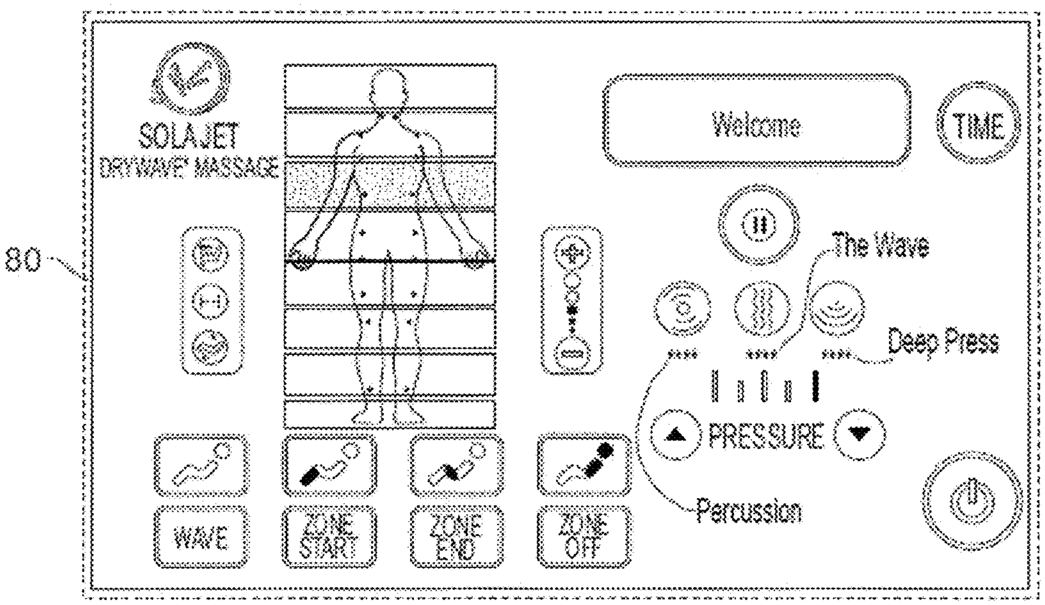

As shown on the example chair control menu screen 80 for the touchscreen 16 as illustrated in the example of FIG. 8B, there are icons for modifying the massage therapy during the receipt of treatment. For example, there are up arrows and down arrows for increasing or decreasing "Pressure," or targeting a specific area of the user's body while the water and air adjustable massage is in progress. Additionally, above the arrow icons is a power icon, and below the arrow icons is an icon for pausing the water and air adjustable massage session in while the water and air adjustable massage is in progress.

Figures 9, 10:
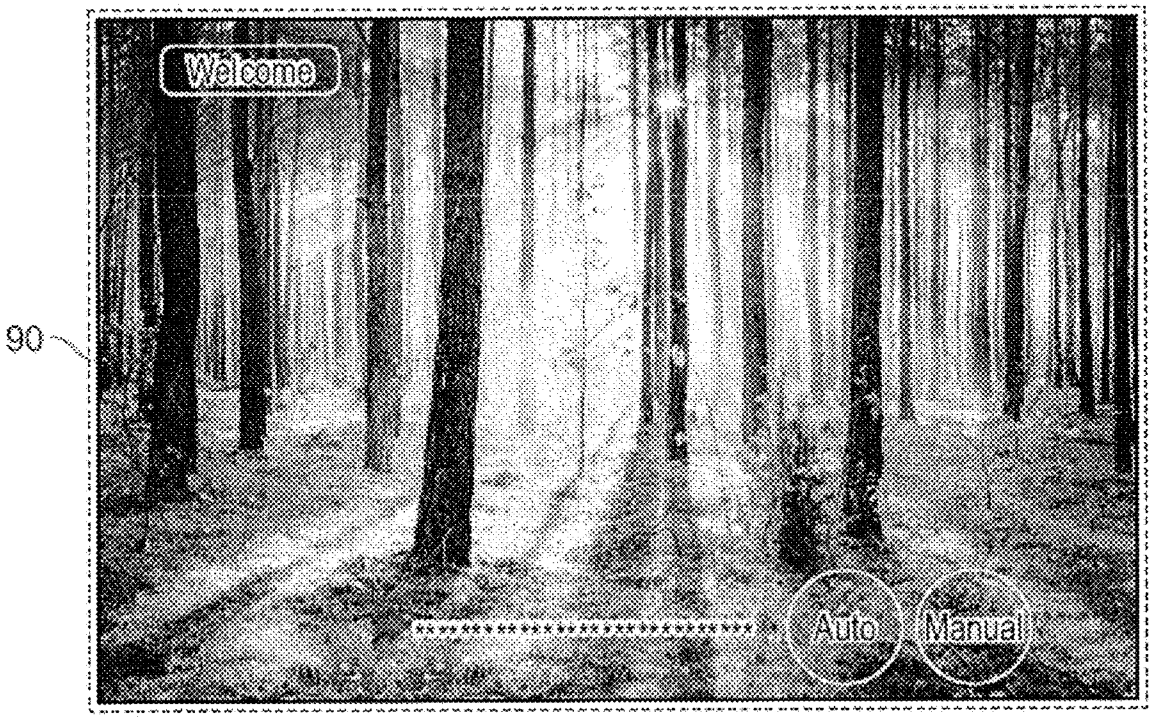
FIG. 9 shows a screenshot of an example alternative screen 90 as it would appear on an attached touchscreen 16 or mobile device.
FIG. 10 is a chart showing one non-limiting example of a membership pricing structure.

Illustrated in FIG. 9, is an example of alternate menu screens 90 that are simplified and encourage the user to relax during use of the water and air adjustable massage chair 10.

More particularly, it is contemplated that customers can, among other things, use the touchscreen 16 to order services, customize the massage, or select specific areas they wish to have massaged, as described in further detail below. It is also contemplated that the water and air adjustable massage chair 10 will implement similar methods for allowing a smartphone software application or through a secure web-based portal, to interface with the massage chair 10 in the same manner as a touchscreen 16.

Other facets of operating the massage chair 10 may be represented in other embodiments. Any such alternate displays are intended to be within the scope of the present disclosure.

Preferred embodiments of massage chair 10 incorporate software to manipulate the roller system in a manner that mimics more closely the feel of a human hand performing a trigger point massage. Trigger point massages are best suited for people who have injuries, chronic pain, or a specific issue or condition. Sometimes areas of tightness in the muscle tissues, known as trigger points, can cause pain in other parts of the body. By concentrating pressure to trigger points, this type of massage can reduce pain. In contrast to the back and forth kneading motion that is approximately 4 inches wide, the software enables a user to manipulate the water filled rollers 20 of massage chair 10 to employ a much narrower pass if the user desires.

Preferred embodiments of the water and air adjustable massage chair 10 have the ability to easily provide the massage services to users within a commercial environment. The software provides the owner information and control of the massage chair 10. Such information includes but is not limited to, the price of the individual session, and the frequency of massage for the user. Additionally, the incorporated software will allow individual memberships to be established wherein a member remits periodic payments for access to massage chair 10 in addition to various other services and products offered, as described in further detail below.

Some embodiments of massage chair 10 also consider it can be offered in a commercial environment with various services and products in which are offered within the context of the same membership structure. These services and products may also be obtained as separately priced items outside of the membership program by those who choose not to secure a membership.

An example of a membership pricing structure is shown in FIG. 10. This membership pricing schedule, more particularly the amount for each service or membership tier provided in FIG. 10, is merely an example, and is not intended to limit the scope of the present invention. Those of skill in the art will understand that any number of pricing and service combinations could be utilized in the context of massage chair 10 as described herein.

As can be seen in the chart illustrated in FIG. 10, membership structure may be in a tiered system, both in relation to price and services provided. This example shows a monthly payment period for membership; however, other periods could be implemented, including weekly, bi-monthly, semi-annually, annually, etc. Along the top row of FIG. 10 are listed possible membership tiers including Premium, Express, and Massage Membership. Each membership tier includes the number of massage sessions which are included in the monthly price.

A person paying for a Premium Membership would have unlimited access to water and air adjustable massage sessions. According to this example, the periodic payment (on a monthly basis in the example) would be the highest for the Premium Membership tier, which affords a customer the most access to the services provided.

The Express (mid-level tier) membership would have a lower monthly fee but would also result in more limited access to the services provided. As in the example illustrated in FIG. 10, a person paying for the Express Membership would only have access to ten (10) water and air adjustable massage sessions as compared to unlimited access accorded to those paying for a Premium Membership.

Also shown in FIG. 10, a Massage Membership tier in which only five (5) water and air adjustable massage sessions would be available. This would be the lowest priced membership tier, and accordingly would be afforded the least amount of access to the water and air adjustable massage services.

It is further anticipated that alternative embodiments may provide options for an a la carte payment method. Payment would be on a per-service or per-access basis, each and every time a person sought such service or access. It is contemplated that prices for individual services would be higher than comparable services under the membership tiers available.

Again, the chart illustrated in FIG. 10 is merely one example of a possible structuring mechanism for membership pricing for providing access to the present invention 10 or other related services in a commercial environment. Many other membership structures could be offered within the scope of the present invention herein described as would be understood by one of ordinary skill in the art. It is also contemplated that access to other health and wellness services may be included in the tiered membership structure, and prices for such memberships as well as access to such services would be determined accordingly.

The figures and descriptions in this application depict specific examples to teach those skilled in the art how to make and use the best mode of the invention. These examples are not given to limit the scope of the invention, but rather to teach inventive principles. To concisely teach inventive principles, some conventional aspects of the invention have been simplified or omitted. Those skilled in the art will appreciate many of the configurations, combinations, subcombinations, and variations on these examples that fall within the scope of the invention. For example, certain features of the invention described in separate embodiments can also be implemented in combination in a single embodiment. Conversely, various features that are described in the context of a single embodiment can also be implemented in multiple embodiments-separately or in any suitable subcombination. The invention is not limited to the specific illustrative examples described herein, but by all embodiments and methods within the scope and spirit of the invention as in the current, amended, or added claims and their equivalents. In any case, all substantially equivalent systems, articles, and methods should be considered within the scope of the invention.

I claim:

1. A therapeutic chair, comprising:

a chair body having a chair back, a chair seat, and a leg section;

a programmable roller system disposed within the chair body and comprising a plurality of massaging rollers, wherein each massaging roller of the plurality of massaging rollers comprises:

an inner roller, a plurality of liquid-filled inserts positioned around an exterior of the inner roller, and a protective ring positioned around the plurality of liquid-filled inserts; and a display configured to present control options to a user for operating the programmable roller system and to control the programmable roller system based on inputs received from the user.

* * * * *